F. A. RYTHER.
BALING PRESS.
APPLICATION FILED JAN. 21, 1910.
958,321.
Patented May 17, 1910.
2 SHEETS—SHEET 1.
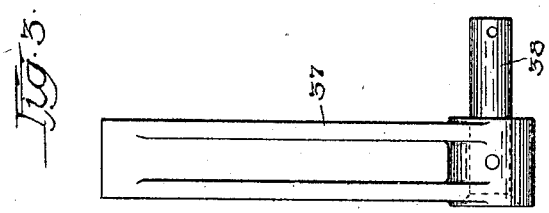
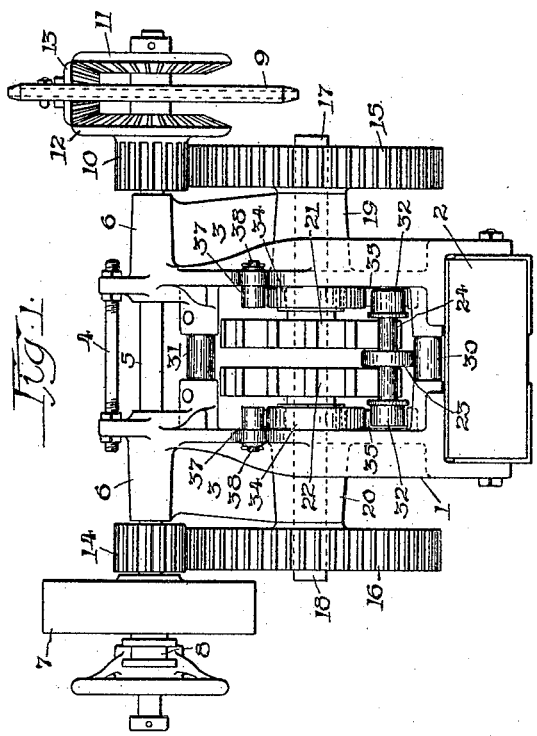
Witnesses:
F. W. Hoffmeister
H. J. Jasmer
Inventor:
Frank A. Ryther
By E. W. Burgess
Attorney

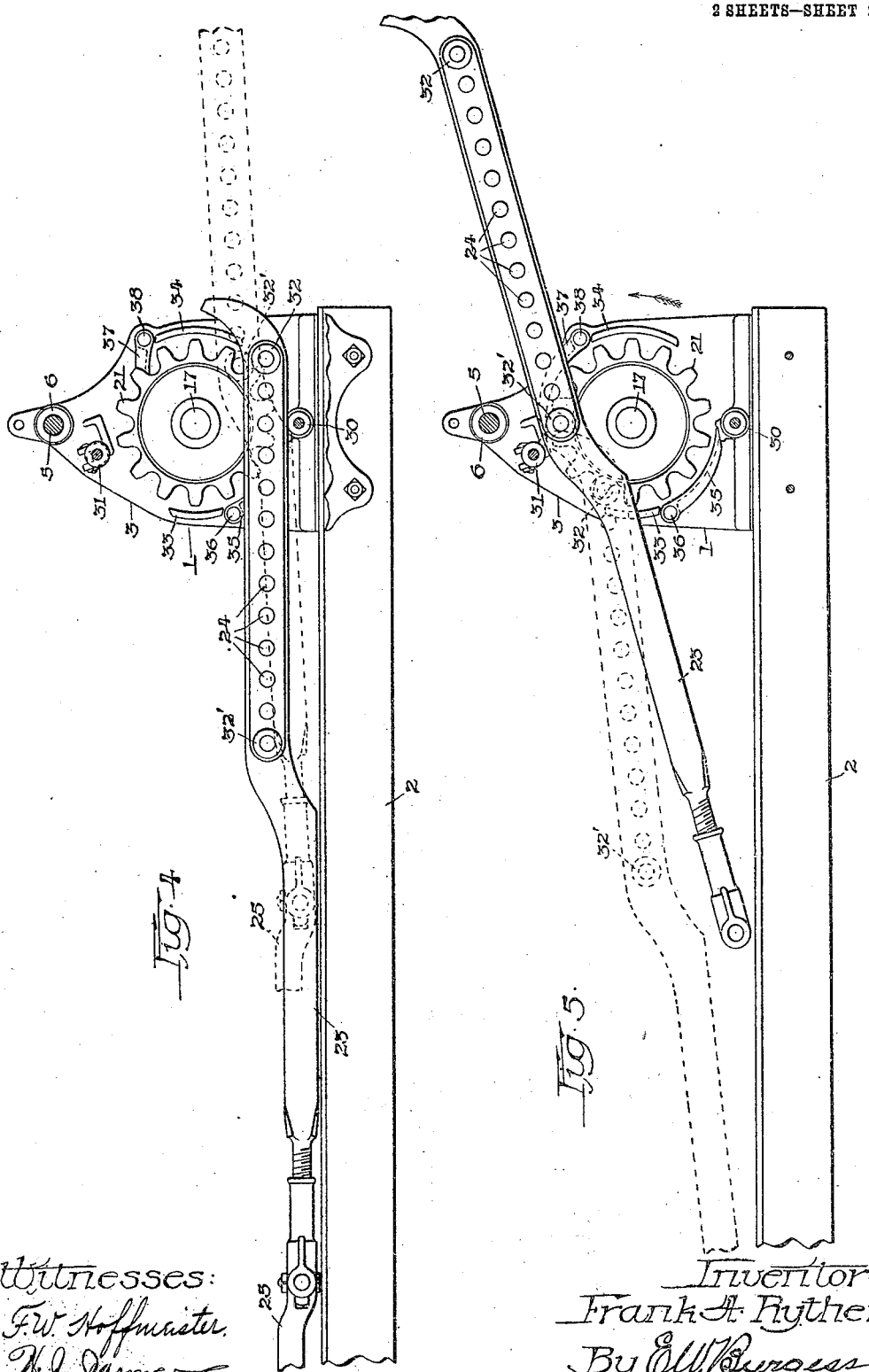

UNITED STATES PATENT OFFICE.

FRANK A. RYTHER, OF CHICAGO, ILLINOIS, ASSIGNOR TO INTERNATIONAL HARVESTER COMPANY, A CORPORATION OF NEW JERSEY.

BALING-PRESS.

958,321.  Specification of Letters Patent.  Patented May 17, 1910.

Application filed January 21, 1910. Serial No. 539,261.

*To all whom it may concern:*

Be it known that I, FRANK A. RYTHER, a citizen of the United States, residing at Chicago, in the county of Cook and State of Illinois, have invented certain new and useful Improvements in Baling-Presses, of which the following is a specification.

My invention relates to baling presses having a rack and pinion mechanism forming part of the power transmitting devices, and in particular to means for guiding the rack in its orbital motion relative to the pinion at opposite ends of its stroke, its object being to provide a guide mechanism that will be positive and efficient in operation and one that will not become inoperative from wear of its parts. These objects are attained by means of the mechanism illustrated in the accompanying drawings, in which—

Figure 1 is an end elevation of a power jack having my invention forming a part thereof; Fig. 2 is a side elevation of one of the side members of the jack, designed to show the manner of mounting the rack guiding members thereon; Fig. 3 is an enlarged detail drawing representing one of the pivotal switch members forming part of the rack guiding means; Fig. 4 is a side elevation of Fig. 1, partly in section, and designed to show the mode of operation of the rack and pinion mechanism; Fig. 5 is a like view representing the rack at its opposite extremity of movement.

The same reference characters designate like parts throughout the several views.

1 represents a power jack secured to a bed frame member 2 of the press and including oppositely disposed side members 3, having their lower ends secured to frame member 2 and their upper ends connected by means of a rod 4. A transverse shaft 5 is journaled in bearings 6 at the upper end of the jack, and 7 represents a fly wheel mounted upon one end of the shaft and adapted to be clutched therewith by means of a common form of clutch mechanism 8, and mounted upon the opposite end of the shaft is a sprocket wheel 9 that is connected with the shaft and the pinion 10, loosely mounted upon the shaft, by means of a differential gear mechanism including a bevel wheel 11 secured to the shaft, a bevel wheel 12 integral with pinion 10, and a pinion 13 journaled upon a radial axis carried by the sprocket wheel and meshing with the bevel wheels in a well-known way.

14 represents a pinion secured to the opposite end of the shaft. The pinions 10 and 14 mesh with gear wheels 15 and 16, respectively, that are secured to the outer ends of independent transverse shafts 17 and 18 journaled in bearings 19 and 20 formed in the side members of the jack, and 21 and 22 represent pinions secured to the inner ends of the shafts, spaced apart and receiving between them a rack bar 23 that is provided, upon opposite sides thereof, with laterally projecting pins 24 with which the pinions operatively engage in a manner to cause the rack to move in an orbital path relative to said pinions, as it is reciprocated from one extremity to the other of its movement, the bar having one end connected with the pull bar 25, forming part of the press mechanism.

30 represents a roller journaled upon a transversely arranged pin below the rack bar and adapted to engage therewith in a manner to prevent it from becoming disengaged from the pinions during its operative movement, and 31 represents a similar roller journaled above the bar and adapted to engage therewith for the same purpose.

For the purpose of maintaining the rack in engagement with the pinions at the extremity of its stroke in opposite directions, there are provided, at its outer end, and upon opposite sides thereof, rollers 32 journaled upon the extensions of the pins, and at its forward end with rollers 32¹, the rollers 32 being adapted to engage with fixed tracks 33 integral with the side members of the jack and arranged concentric with the axis of the pinions 21 and 22 at the side in the direction of the pull bar, and 34 represents like fixed tracks upon the opposite sides of the axis of the pinions.

35 represents movable tracks arranged concentrically with the axis of the pinions and pivotally connected at 36 with the side members of the jack at the lower ends of the fixed tracks 33 and normally forming a continuation thereof for the purpose of engaging with the rollers 32 at the outer end of the rack bar in a manner to guide said bar in its downward movement relative to the actuating pinions when moving in a forward direction, and when moving in an opposite direction to swing upward as the rollers 32¹, at the opposite end of the rack, engage therewith. 37 represents like movable tracks pivotally connected with the side members of the jack at 38 adjacent the upper end of the fixed tracks 34 and adapted to form a continuation of the same to engage with rollers 32¹ at the inner end of the rack bar in a manner to control the movement thereof in an upward direction and to swing downward to permit rollers 32 at the opposite ends of the rack to pass. The rack bar is curved upward at its rear end and downward at its forward end, the curved portions engaging with the rollers 30 and 31 in a manner to prevent disengagement of the rack and pinions at the extremity of the stroke of the bar in opposite directions.

In operation the pinions 21 and 22 are rotated in a direction indicated by the arrow in Fig. 5, and the rack is caused to move in a forward direction, the rollers at the forward end of the bar passing below the movable tracks 37 and having their path of movement controlled thereby, and those at the opposite end above them, and as the outer end of the bar is moved in an orbital path about the pinions and moved downward at the forward side thereof, the rollers at its outer end engage with and have their path of movement controlled by the movable tracks 35, which swing upward and allow the rollers at the forward end of the bar to pass under them.

What I claim as my invention, and desire to secure by Letters Patent, is:

1. A baling press including, in combination, a rack, rotatable pinions adapted to reciprocate said rack in an orbital path relative thereto, fixed tracks adapted to guide said rack through a part of its movement, and movable tracks coöperating with said fixed tracks.

2. A baling press including, in combination, a rack, guide rollers at opposite ends of said rack, rotatable pinions adapted to reciprocate said rack in an orbital path relative thereto, fixed tracks adapted to engage with said guide rollers during a part of the movement of said rack, and movable tracks coöperating with said fixed tracks.

3. A baling press including, in combination, a power jack including vertically arranged side members, independent axially alined shafts journaled in said side members, pinions secured to the inner ends of said shafts and having an intervening space between them, a rack bar having pins projecting laterally upon opposite sides thereof, said pinions engaging with said pins in a manner to cause said rack to move in an orbital path relative thereto, guide rollers upon opposite sides and at opposite ends of said rack, fixed tracks integral with said side members and concentric with the axial line of said shafts, said tracks adapted to engage with said rollers during a part of the movement of said rack, and pivotal tracks coöperating with said fixed tracks.

4. A baling press including, in combination, a power jack including vertically arranged side members, independent axially alined shafts journaled in said side members, pinions secured to the inner ends of said shafts and having an intervening space between them, a rack including a bar having pins projecting laterally upon opposite sides thereof, a pull bar connected with one end of said rack, said pinions engaging with said pins in a manner to cause said rack to move in an orbital path relative thereto, guide rollers upon opposite sides and at opposite ends of said rack, fixed tracks integral with said side members upon opposite sides of the axial line of said shafts in the direction of movement of said pull bar and concentric with said axial line, said tracks adapted to engage with said rollers during a part of the movement of said rack, and tracks pivotally connected with said side members and coöperating with said fixed tracks.

FRANK A. RYTHER.

Witnesses:
A. F. DAVIS,
E. J. TEUFEL.